UNITED STATES PATENT OFFICE.

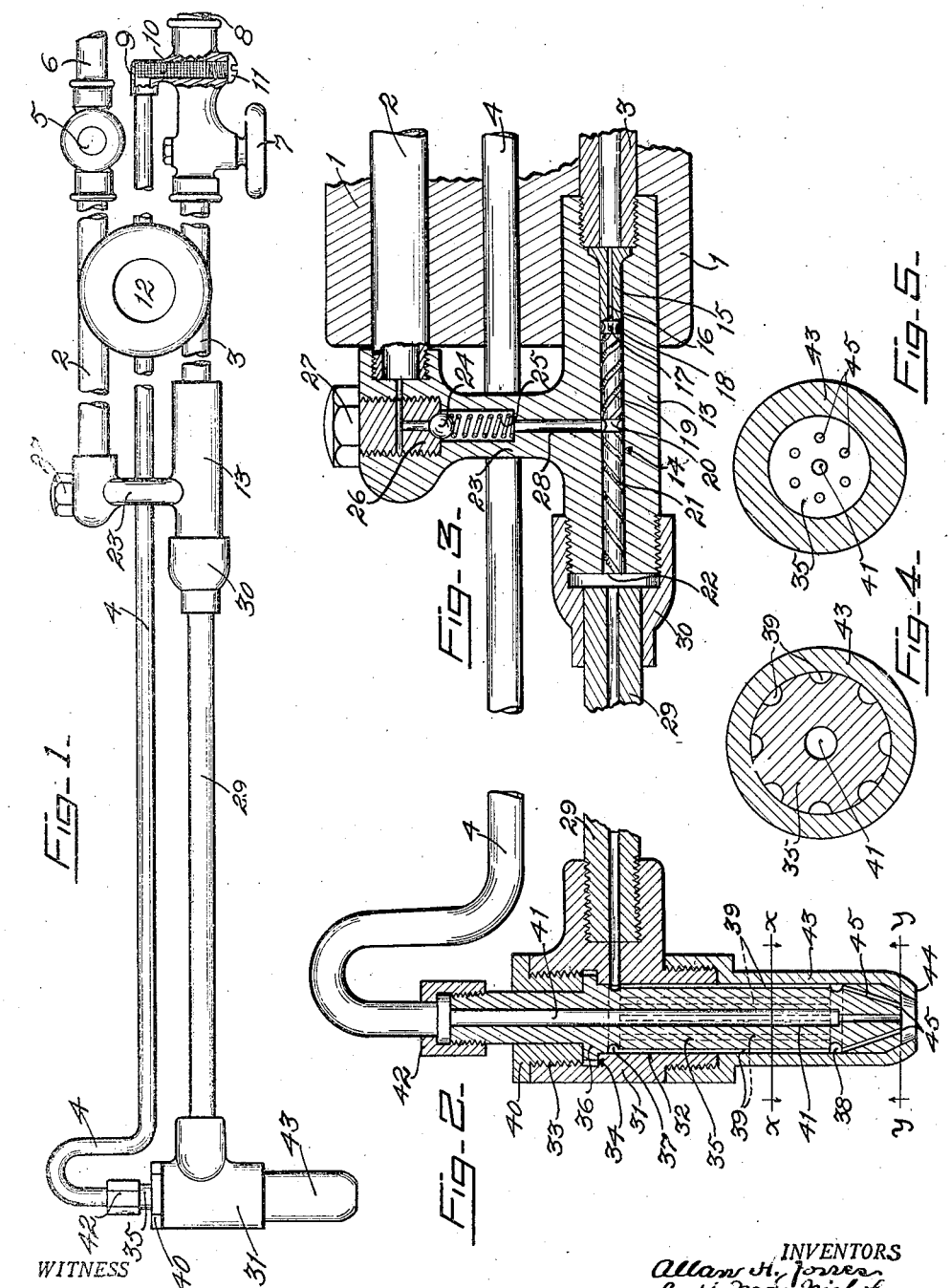

ALLAN H. JONES AND CHARLES H. MacNICHOLS, OF OAKLAND, CALIFORNIA, ASSIGNORS, BY DIRECT AND MESNE ASSIGNMENTS, OF ONE-HALF TO SAID JONES AND ONE-HALF TO F. L. WILDES, OF OAKLAND, CALIFORNIA.

CUTTING AND WELDING TORCH.

1,262,351.      Specification of Letters Patent.      Patented Apr. 9, 1918.

Application filed November 1, 1915. Serial No. 59,079.

*To all whom it may concern:*

Be it known that we, ALLAN H. JONES and CHARLES H. MACNICHOLS, citizens of the United States, residing at Oakland, in the county of Alameda and State of California, have invented certain new and useful Improvements in Cutting and Welding Torches, of which the following is a specification.

The present invention relates to the class of gas-burning torches for industrial purposes, and more particularly to a combined welding and cutting torch designed especially for use with a mixture of acetylene and oxygen gases.

In devices for this purpose it is necessary that acetylene and oxygen, at a relatively low pressure, be brought together in some suitably formed chamber or passage, and thoroughly mixed therein to form a homogeneous gas of uniform composition. This gas, or mixture of gases, must then be led to a suitable burner-head, and thence discharged in such a manner that, when ignited, a relatively long pointed flame results. When the torch is used for cutting metals, a separate jet of oxygen at a relatively high pressure must be discharged into or in close proximity to the flame-jet, said high-pressure oxygen jet being for the purpose of burning the metal already heated to the proper temperature by the oxy-acetylene flame.

The object of the present invention, therefore, is to provide a cutting and welding torch which is capable of mixing two gases, as, for example, oxygen and acetylene, into a homogeneous mixture of uniform quality; which discharges the gaseous mixture thus formed in a manner to provide a flame of the most desirable form and of the highest possible temperature, without danger of the flame striking back into the gas passages or chambers within the torch; and which can be made to direct an oxygen cutting jet in the most effective position with respect to said flame; and by these characteristics to enable better, more rapid, and more efficient results to be obtained than are possible with any of the devices at present known to the applicants.

In order to comprehend the invention, reference should be had to the accompanying drawings, in which—

Figure 1 is an elevation of the device, the stock or handle being omitted.

Fig. 2 is a sectional view of the burner head, enlarged.

Fig. 3 is a sectional view of the mixing head, enlarged.

Figs. 4 and 5 are transverse sections of the burner, taken respectively on the lines $x$—$x$ and $y$—$y$ of Fig. 2 of the drawings, and viewed in the directions of the arrows.

In Fig. 3 of the drawings, the numeral 1 represents a substantially cylindrical stock, suitably formed of wood or other material, which serves both as a handle by which the torch may be grasped and manipulated, and as a support for the acetylene tube 2, the low-pressure oxygen tube 3 and the high-pressure oxygen tube 4 therewithin. The tube 2 is fitted at its outer end with a control valve 5, Fig. 1 of the drawings, and, beyond said control valve, a suitably formed fitting 6 to which may be attached a flexible tube, not shown in the drawings, for conducting acetylene into the said tube 2.

The tube 3 is similarly fitted with a control valve 7 and a connection 8 adapted to receive a flexible tube, not shown in the drawings, for supplying oxygen to the said tube 3. Between the valve 7 and the hose-connection 8, a T or branch 9 leads off and connects with the high-pressure tube 4, for supplying oxygen thereto. Within the T 9 is a cleansing screen 10, through which the high-pressure oxygen must pass, held in place by the removable screw 11. A suitable control valve 12 is located in the high-pressure oxygen tube 4, operatable from outside the stock or handle 1.

The low-pressure oxygen tube 3 ends in a mixing head 13, formed as shown in Fig. 3 of the drawings, with a cylindrical interior bore or chamber 14 within which is fitted a stem 15, said stem having a central axial hole 16 for a portion of its length, one or more radial holes 17 connecting said central hole 16 with a transverse circumferential groove 18, a series of spaced spiral grooves 19 connecting said circumferential groove 18 with a similar circumferential groove 20, and a second series of spiral grooves 21 leading from the circumferential groove 20 to the end 22 of the stem 15, the spiral of said grooves 21 being opposite to that of the first mentioned spiral grooves 19.

The mixing head 13 is formed, as shown, with a branch or T 23, to the upper end of which is connected the acetylene tube 2, and which contains a check valve for preventing back-pressure in said tube 2, said valve consisting of a ball 24 pressed by a spring 25 against a removable seat 26. A removable plug 27 permits access to said valve. The acetylene passage 28 within said T 23 communicates, as shown in Fig. 3 of the drawings, with the second circumferential groove 20 of the stem 15 within the mixing chamber 14, which is situated a distance from the hereinafter described burner head.

A feed tube 29 is connected at one end to the mixing head 13, preferably by some form of readily detachable coupling, as, for example, a union 30. The other end of said feed tube 29 ends in a substantially T-shaped burner head 31, Figs. 1 and 2 of the drawings. In the preferred form illustrated herein, this burner head 31 is at right angles to the feed tube 29, although it may be formed at any other angle in accordance with the necessities of any particular work for which the torch may be designed.

The burner head 31 has a cylindrical interior bore 32, Fig. 2 of the drawings, a portion 33 of which is enlarged and threaded, forming a shoulder 34. A burner stem 35, having a collar 36, two transverse circumferential grooves 37 and 38, and a series of shallow longitudinal grooves 39, Figs. 2 and 4 of the drawings, extending between said transverse grooves, fits within the head 31, and is held therein by the collar 36 being clamped between the shoulder 34 and a nut 40 screwed into the enlarged portion 33 of the bore of said head.

The burner stem 35 is also formed with an axial hole or passage 41 running from end to end thereof. The upper or rear end of said stem 35 is connected, preferably by means of a union 42, to the high-pressure oxygen tube 4. The opposite or forward end of the burner stem 35 is inclosed by a closely fitting burner tip 43, removably attached to the head 31, and extending a slight distance beyond the end of said stem 35 to form a shield or hood 44. A series of spaced, substantially longitudinal, inclined bores 45, Figs. 2 and 5 of the drawings, are formed in the stem 35 extending to the forward end thereof from the transverse groove 38.

Acetylene gas, entering the mixing head 13 through the passage 28, Fig. 3 of the drawings, meets, in the transverse groove 20, a stream of oxygen which has been given a rotary whirling motion by the spiral grooves 19. The two gases are then given an opposite whirling motion by the spiral grooves 21, and pass out of the mixing head 13 and through the feed tube 29, to the burner head 31. Entering said head 31 opposite the transverse groove 37, Fig. 2 of the drawings, in the stem 35, the mixed gases pass through the longitudinal grooves or passages 39, between said stem 35 and the walls of the head 31 and the tip 43, and finally out through the bores 45.

On account of the relative positions of said bores 45, the issuing gaseous mixture forms a cone, and when ignited provides a flame of the most favorable form. When it is desired to use the device as a cutting torch, oxygen at a relatively high pressure is admitted to the central opening or passage 41 of the burner stem 35, through the valve 12 and the tube 4, and issues as a single jet in the center of the flame cone.

The tortuous path which the gases are constrained to follow through the mixing head 13, and the length of the feed tube 29 insure a most intimate and perfect mixture of said gases before they reach the heated parts of the burner head, thus providing a flame of the highest possible temperature. Back-firing of the unburned gases is prevented by the small areas of the passages in the burner head, particularly the bores 45 and the longitudinal grooves 39. The shield or hood 44 formed by the end of the burner tip 43 serves to protect the end of the burner stem 35 from injury and the small orifices therein from becoming clogged by foreign matter.

In the foregoing specification, the device has been described as particularly adapted for the use of acetylene and oxygen, to produce an oxy-acetylene flame for welding or cutting such metals as iron or steel. It is to be understood, however, that the torch may also be used with other gases, such as hydrogen and oxygen or commercial illuminating gas and oxygen, to produce a flame of lower temperature than the oxy-acetylene flame. We therefore do not limit ourselves to a torch for burning the particular gases mentioned above, nor to the preferred form and construction of the device as herein described and illustrated, but on the contrary, we wish to claim the invention as broadly as the state of the art will permit.

Having thus described our invention, what we claim as new and desire to protect by Letters Patent, is:—

1. In a torch for the described purpose, the combination with a burner head, of a mixing head connected thereto at a distance therefrom, a mixing chamber within said last mentioned head, a longitudinally ported stem situated within said mixing chamber and provided with radially disposed outlets communicating with spirally disposed grooves on the exterior surface of the stem, said stem being grooved at a point intermediate its length, means for supplying oxygen under pressure to the said mixing stem, a valve controlled passageway within the head communicating with the circumferential groove of the said stem, means for supplying combustible gas to said valve controlled passageway through which the same is conveyed to the annular groove of the mixing stem, said stem being exteriorly grooved spirally from the annular groove thereof toward its forward end, and a feed tube connecting the mixing chamber with the burner head.

2. In a torch for the described purpose, and in combination a mixing head provided with an interiorly disposed mixing chamber and a valved passageway communicating with said chamber, a longitudinally disposed mixing stem situated within said mixing chamber and formed exteriorly with an annular groove, and provided with oppositely disposed spiral grooves communicating with said annular groove, and said stem further provided at its forward end with a longitudinally disposed bore communicating with one series of said spiral grooves by radially disposed outlets, and means for supplying through said stem to the mixing chamber and through the valved passage in the mixing head respectively a stream of oxygen and combustible gas.

3. In a torch for the described purpose, the combination with a burner head, of a mixing head provided with a mixing chamber for combustible gas and oxygen situated at a distance remote from the burner head, a feed tube connection between the said mixing head and the burner head, a stem detachably mounted within the burner head and provided with relatively long longitudinally disposed passageways arranged within its surface and terminating in converging bores for the flow therethrough and discharge therefrom of a gaseous mixture passing through the lower end of the body of said stem, and said stem further provided throughout the length thereof with a centrally disposed passageway for the flow therethrough of oxygen under pressure, a valve controlled supply tube for admitting oxygen under high pressure to the discharge end of the burner stem through said centrally disposed passageway, and a hood carried by the burner head and projected a distance beyond the outlet end of the stem arranged therein.

4. In a torch of the character described, the combination with a burner head, of a mixing chamber communicating therewith, a longitudinally ported stem having radially disposed ports leading therefrom discharging into the mixing chamber, mixing means within said chamber, means for introducing independent supplies of combustible fuel producing fluids to the chamber, one of the fluids being introduced to the mixing chamber through the ports in the stem, and means connecting the mixing chamber with the burner head.

5. In a torch of the character described, the combination with a burner head, of a mixing chamber, and a connection between said burner head and the chamber, means for introducing independent charges of a fuel producing fluid and a combustion supporting fluid to the mixing chamber at different points, mixing means in said chamber for imparting a circuitous movement to one of the fluids prior to the admission of the other fluid thereto, the said mixing means being formed to compel the combined fluids to take circuitous movement, after the introduction of one to the other, substantially as described.

6. A torch of the character described, comprising a burner head, a mixing chamber, means connecting said burner head and mixing chamber, means for introducing oxygen to said mixing chamber, means within the mixing chamber for imparting a movement to the oxygen while the same is passing therethrough, and means for introducing gases to the mixing chamber to commingle with the rapidly moving oxygen, said means within the mixing chamber causing a further circuitous movement of the oxygen and gas, prior to its discharge to the burner head.

7. In a torch for the described purpose, the combination with a burner head, of a mixing head provided with a mixing chamber for combustible gas and oxygen situated at a distance remote from the burner head, a feed tube connection between the said mixing head and the burner head, a stem detachably mounted within the burner head and provided with longitudinally disposed passageways terminating in suitable outlets for the flow therethrough and discharge therefrom of a gaseous mixture, and said stem being further provided throughout the length thereof with a centrally disposed passageway for the flow therethrough of oxygen under pressure, a valve controlled supply tube for admitting oxygen under high pressure to the discharge end of the burner stem through said centrally disposed passageway, and a hood carried by the burner head and projected a distance beyond the outlet end of the stem arranged therein.

8. In a torch of the character described, the combination with a burner head, of a mixing chamber, a pipe connecting said mixing chamber with the burner head, a member located within the mixing chamber and having a spiral passageway, means for introducing oxygen to said mixing chamber to pass through said spiral passageway to impart to the oxygen a whirling movement, and means for introducing gas to the whirling oxygen, the said mixing member having on one side thereof a spiral passageway leading in a direction opposite to that of the first mentioned spiral passageway for reversing the direction of the circular movement of the oxygen after the admission of the gas to completely commingle the same with the oxygen prior to its discharge to the burner head.

9. A torch of the character described comprising a mixing chamber and a burner head, a connection between said chamber and head, means for introducing a fuel producing fluid to the mixing chamber, a member located in said chamber for imparting to said fluid a whirling movement, means leading to the mixing chamber for introducing a combustion supporting fluid thereto, the said member within the mixing chamber being formed to compel the combined fluids after the admission of one to the other to take a whirling course prior to the discharge thereof to the burner head.

10. In a torch of the character described, the combination with a burner head, of a mixing chamber, a connection between the chamber and head, means for introducing a supply of oxygen to the mixing chamber, a member located within said mixing chamber for causing the oxygen to travel in a circuitous path, means for introducing gas to the traveling oxygen, the said mixing member being formed to cause the oxygen and gas to travel in a circuitous path, the direction of movement of the oxygen and gas being the reverse of the direction of movement of the oxygen to completely mix the oxygen and gas prior to its discharge to the burner head.

11. In a torch of the character described, the combination with a burner head, of a mixing chamber and a communication between said chamber and head, means for introducing independent supplies of a fuel producing fluid and a combustion supporting fluid to the mixing chamber at different points, means within the mixing chamber for compelling a circuitous movement of one of the fluids prior to the admission of the other thereto, and for causing the combined fluids, after the admission of one to the other, to travel in a circuitous path, the direction of movement thereof being opposite to the direction of movement of one of the fluids prior to the admission of the other thereto.

12. In a torch of the character described, the combination with a burner head, of a mixing chamber, means for connecting the burner head with the mixing chamber, means for introducing at different points independent supplies of a fuel producing fluid and a combustion supporting fluid, means within said chamber to cause one of the fluids to travel in a spiral direction prior to the admission of the other fluid thereto, said means also compelling the combined fluids to move in a spiral direction prior to the discharge thereof of the burner head.

13. A torch of the character described comprising a mixing chamber, and a burner head, a connection between said mixing chamber and the burner head, means for introducing a fuel producing and a combustion supporting fluid independently into the mixing chamber, means within the mixing chamber for causing a movement of one fluid prior to the admission of the other thereto, and for compelling a circuitous movement of the combined fluids after the admission of one to the other.

In testimony whereof we have signed our names to this specification in the presence of two subscribing witnesses.

ALLAN H. JONES.
CHARLES H. MacNICHOLS.

Witnesses:
S. HARDIN,
GEO. E. MORRILL.